United States Patent [19]
Xing

[11] Patent Number: 5,837,397
[45] Date of Patent: Nov. 17, 1998

[54] LAMINAR (FLAT OR PAPER-TYPE) LITHIUM-ION BATTERY WITH SLURRY ANODES AND SLURRY CATHODES

[75] Inventor: Xuekun Xing, Richmond Heights, Ohio

[73] Assignee: Gould Electronics Inc., Eastlake, Ohio

[21] Appl. No.: 747,143

[22] Filed: Nov. 8, 1996

[51] Int. Cl.[6] ................................................. H01M 6/46
[52] U.S. Cl. ......................... 429/162; 429/197; 429/217; 429/224
[58] Field of Search ................................. 429/190, 192, 429/194, 197, 217, 218, 224, 162

[56] References Cited

U.S. PATENT DOCUMENTS

| | | | |
|---|---|---|---|
| 4,080,728 | 3/1978 | Buckler | 29/623.4 |
| 4,105,815 | 8/1978 | Buckler | 429/152 |
| 4,177,330 | 12/1979 | Gordon et al. | 429/152 |
| 4,386,019 | 5/1983 | Kaun et al. | 252/503 |
| 4,429,026 | 1/1984 | Bruder | 429/152 |
| 4,455,358 | 6/1984 | Graham et al. | 429/190 |
| 4,466,470 | 8/1984 | Bruder | 141/1.1 |
| 4,977,046 | 12/1990 | Bleszinski, Jr. et al. | 429/194 |
| 5,292,601 | 3/1994 | Sugeno et al. | 429/197 |
| 5,380,606 | 1/1995 | Itou et al. | 429/194 |
| 5,422,203 | 6/1995 | Guyomard et al. | 429/194 |
| 5,491,041 | 2/1996 | Abraham et al. | 429/212 |
| 5,620,811 | 4/1997 | Zhang et al. | 429/192 |

*Primary Examiner*—M. Nuzzolillo
*Attorney, Agent, or Firm*—Michael A. Centanni

[57] ABSTRACT

In one embodiment, the present invention provides a lithium-ion battery and a method of preparing a lithium-ion battery containing a slurry anode including a carbonaceous material, a first electrolyte salt and a first organic solvent; and a slurry cathode including a conductor, a second electrolyte salt, a second organic solvent and a lithium transition metal oxide, with the proviso that neither the slurry anode nor the slurry cathode contain a binder.

19 Claims, 1 Drawing Sheet

LAMINAR (FLAT OR PAPER-TYPE) LITHIUM-ION BATTERY WITH SLURRY ANODES AND SLURRY CATHODES

FIELD OF THE INVENTION

The present invention relates to a lithium-ion battery and simplified methods for making the lithium-ion battery. More particularly, the present invention relates to a lithium-ion battery containing a slurry anode and a slurry cathode which do not need a binder or binder solvent, and to simplified methods of making the same.

BACKGROUND OF THE INVENTION

The conventional manufacture of lithium-ion batteries is based, in part, on the formation of dry-formed bound anodes (typically carbon-containing materials) and bound cathodes (typically lithiated metal oxides). The conventional manufacture requires the use of a binder, such as polyvinylidene fluoride, and additional binder solvents in order to dissolve the binder enabling the preparation of castable mixtures. The additional binder solvents typically used are n-methyl pyrrolidinone and dimethyl formamide. The use of dry-bound anodes and cathodes involves complicated multi-step procedures including casting and extrusion, laminating, vacuum drying, and pressing. These procedures are both time consuming and costly. Accordingly, it is desirable to obtain lithium-ion batteries which are easily produced, economically produced yet retain the beneficial characteristics associated with lithium-ion batteries.

The following problems are associated with conventionally manufactured lithium-ion batteries. The binder and its solvent needed in order to make the lithium-ion batteries are costly and raise environmental concerns. The method of manufacturing conventional lithium-ion batteries is somewhat complicated and lengthy.

SUMMARY OF THE INVENTION

In one embodiment, the present invention provides a lithium-ion battery containing a slurry anode including a carbonaceous material, a first electrolyte salt and a first organic solvent; and a slurry cathode including a conductor, a second electrolyte salt, a second organic solvent and a lithium transition metal oxide, with the proviso that neither the slurry anode nor the slurry cathode contain a binder. In another embodiment, the present invention provides a method of preparing a lithium-ion battery including the steps of preparing a slurry anode by combining a carbonaceous material, a first electrolyte salt, and a first organic solvent; providing a slurry cathode by combining a conductor, a lithium transition metal oxide, a second electrolyte salt and a second organic solvent, with the proviso that neither the slurry anode nor the slurry cathode contain a binder; casting the slurry anode on a first metal collector; casting the slurry cathode on a second metal collector; and combining the slurry anode and the slurry cathode with a separator therebetween so as to form a lithium-ion battery.

As a result of the novel lithium-ion batteries and novel methods of making the same, the present invention provides solutions to the problems commonly associated with lithium-ion batteries. Furthermore, the present invention provides novel lithium-ion batteries and methods for preparing the same which are especially suited for laminar constructures.

More particularly, the batteries of the present invention avoid the use of binders and binder solvents thus reducing the cost of products needed to manufacture the lithium-ion batteries. During the manufacture of the lithium-ion batteries of the present invention, it is not necessary to conduct solvent removal steps, such as evaporation or special dry operations, in order to remove binder solvents. The simplified manufacturing procedure provided by the present invention reduces the possibility of environmental contamination and improves the productivity thereof.

DETAILED DESCRIPTION

Figure 1:
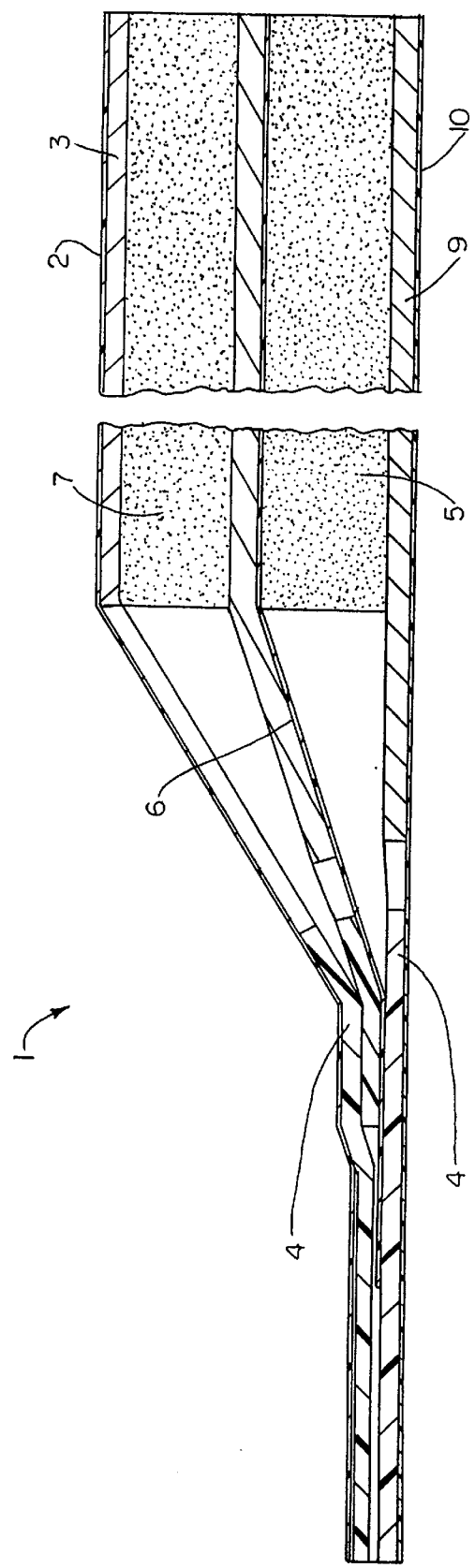
FIG. 1 represents an illustration of an embodiment of a lithium-ion battery according to the present invention.

Lithium ion batteries in accordance with the present invention contain a slurry anode and a slurry cathode. The term "slurry" refers to the physical characteristics of the anode and cathode. In particular, a slurry refers to a paste-like material. In other words, a slurry is not a powder or a liquid, but instead it is a material described as a physical mixture of a liquid and a solid where both components are present in significant proportion and having intermediate properties of the individual constituents. For instance, a slurry may hold its shape (subject to slight deformation from gravity), but may readily flow upon the application of slight pressure. These particular characteristics may be manipulated, as desired, by varying the amounts of the slurry components in the slurry anode or slurry cathode.

The slurry anode contains a carbonaceous material. The slurry anode contains from about 55% to about 80% by weight of the carbonaceous material. In a preferred embodiment, the slurry anode contains from about 65% to about 75% by weight of the carbonaceous material. The carbonaceous material is a carbon source or a material which contains carbon. Examples of carbonaceous material include synthetic and natural graphite, petroleum coke, carbon fiber, petroleum pitches, modified graphite and combinations of one or more thereof. The carbonaceous material may also include graphitized or pyrolysed materials, various carbonized organic materials having a greater or lesser graphite content. Optionally, a conductive medium enhancer may be mixed with the carbonaceous material. Examples of conductive medium enhancers include carbon based materials such as carbon black, acetylene black and furnace black. The conductive medium enhancer may be present form 0% to 50%, and preferably 1% to 20% by weight of the carbonaceous material.

The slurry anode contains a first organic solvent while the slurry cathode contains a second organic solvent. The organic solvents of the slurry anode and the slurry cathode are non-aqueous. Moreover, the organic solvents may be polar aprotic organic compounds. Each organic solvent may be one solvent or a mixture of two or more organic solvents. In one embodiment, the first organic solvent of the slurry anode is the same as the second organic solvent of the slurry cathode. In another embodiment, before the battery is assembled, the first organic solvent of the slurry anode is different from the second organic solvent of the slurry cathode. After assembly it can be assumed that the components will mix and eventually achieve an equilibrium distribution. For instance, if different organic solvent is used in the slurry anode compared to the slurry cathode, after assembly and use both the slurry anode and the slurry cathode will contain a mixture of both of the organic solvents.

The amount of the organic solvent used in the slurry anode is between about 18% and about 40% by weight. In a preferred embodiment, the amount of organic solvent used in the slurry anode is between about 20% and about 30% by weight. The amount of the organic solvent used in the slurry cathode is between about 20% and about 45% by weight. In a preferred embodiment, the amount of organic solvent used in the slurry cathode is between about 22% and about 32% by weight.

The organic solvents may be one or more organic carbonates and/or other organic solvents. Exemplary organic solvents include: dimethyl carbonate, diethyl carbonate, ethylene carbonate, dipropyl carbonate, propylene carbonate, gamma-butyrolactone, tetrahydrofuran, dimethoxyethane (glyme), diglyme, triglyme and other glycol ethers, dimethoxysulfoxide, dioxolane, sulfolane and mixtures thereof. In a preferred embodiment, the organic solvent is a mixture of dimethyl carbonate and ethylene carbonate or diethyl carbonate and ethylene carbonate. The organic solvents are characterized in that they only contain water in a small amount, such as about 20 ppm or less. In this connection, although the organic solvents are non-aqueous, they do not have to be completely anhydrous as they may contain low levels of water contamination. However, anhydrous organic solvents may be used.

The slurry anode contains at least one first electrolyte salt while the slurry cathode contains at least one second electrolyte salt. The amount of the first electrolyte salt in the slurry anode is between about 1% and about 4% by weight. In a preferred embodiment, the amount of the first electrolyte salt in the slurry anode is between about 2% and about 3% by weight. The amount of the second electrolyte salt in the slurry cathode is between about 1% and about 5% by weight. In a preferred embodiment, the amount of the second electrolyte salt in the slurry cathode is between about 2% and about 3% by weight. In one embodiment, the first electrolyte salt of the slurry anode and the second electrolyte salt of the slurry cathode are the same.

The first and second electrolyte salts are preferably a lithium-containing salt. Preferred lithium-containing salts include $LiPF_6$, $LiAsF_6$, $LiClO_4$, $LiCF_3SO_3$, $LiN(CF_3SO_2)_2$, and combinations thereof. The preferred lithium-containing salts include $LiPF_6$, $LiAsF_6$ and $LiClO_4$. The concentration of the electrolyte in the organic solvent is from about 0.5M to about 2.5M in the slurry anode and from about 0.5M to about 2.5M in the slurry cathode, and preferably from about 1M to about 2M in the slurry anode and from about 1M to about 2M in the slurry cathode.

The slurry cathode contains a lithium transition metal oxide which acts as a cathode-active material. The slurry cathode contains a lithium transition metal oxide in an amount between about 55% and about 80%. Preferably, the slurry cathode contains a lithium transition metal oxide in an amount between about 60% and about 70% by weight. Preferred examples of the lithium transition metal oxide include $LiMn_2O_4$, $LiCoO_2$, $LiNiO_2$, $LiNi_xCo_{1-x}O_2$ (0<x<1) and mixtures thereof. In one embodiment, lithium transition metal oxides specifically exclude $MnO_2$. Optionally, a conductive medium enhancer may be mixed with the lithium transition metal oxide. Examples of conductive medium enhancers include carbon based materials such as carbon black, acetylene black and furnace black. The conductive medium enhancer may be present form 0% to 50%, and preferably 1% to 20% by weight of the lithium transition metal oxide.

The slurry anode and the slurry cathode are characterized in that they do not contain a binder. Binders include ethylene propylene diene monomer, polyolefins, polytetrafluoroethylene, polyvinylidene fluoride, polyvinylidene difluoride, polyamide resin, polyvinyl pyrrolidone, hydroxyalkylcellulose, various elastomers and mixtures thereof. The presence of a binder may complicate the fabrication of the lithium-ion battery.

The slurry anode and the slurry cathode are further characterized in that they do not contain aqueous solvents. Aqueous solvents include water and solutions containing a substantial amount of water. The absence of water improves the performance of the lithium-ion battery because side reactions caused by the presence of water are avoided.

The slurry anode and/or the slurry cathode may contain additional components which improve the performance of the resultant lithium-ion batteries. For instance, the slurry anode an/or the slurry cathode may contain dispersing agents and/or surfactants and more particularly nonionic surfactants. Examples of nonionic surfactants include sorbitan derivatives such as sorbitan monooleate (Span-80 available from ICI Surfactants), and ethoxylated alkyphenols such as octylphenoxypolyethoxyethanol (Triton X-100 available from Union Carbide) and others.

In addition to the slurry anode and slurry cathode, the lithium-ion battery of the present invention may also contain a separator. The separator, which prevents direct contact between electrodes, is situated between the slurry anode and the slurry cathode. The thickness of the separator is from about 0.02 mm to about 0.05 mm. Preferably, the thickness of the separator is from about 0.025 mm to about 0.035 mm. The separator is preferably microporous. In one embodiment, the separator may be made of polyolefin such as polyethylene, polypropylene or copolymers of polyethylene and polypropylene, polyester, nylon, or glass fiber. In another embodiment, the separator may be made of fibers and/or cellulosic materials, woven or non-woven fibrous material.

The slurry anode and the slurry cathode both may contain a current collector. The current collector collects the current flowing through the anode and the cathode, and it also functions as a bridge between the electrodes and electrical leads. The current collector may be a foil type or a mesh type. The current collector is typically made of a conductive metallic material. The foil or mesh may be roughened or unroughened metal. Examples of conductive metallic material include copper, nickel, aluminum, carbon, silver, titanium, and alloys thereof. The current collector may also be made of stainless steel. Alternatively, the current collector may be made of a conductive plastic, such as metallized plastic film (e.g., metallized polyethylene film). The current collector of the slurry anode may be or may not be made of the same material as the current collector of the slurry cathode. In a preferred embodiment, the current collector of the slurry anode is copper or nickel. In another preferred embodiment, the current collector of the slurry cathode is aluminum or stainless steel. The thickness of the current conductor is about 0.01 mm to about 0.2 mm. In a preferred embodiment, the thickness of the current collector is about 0.02 mm to about 0.1 mm. In a more preferred embodiment, the thickness of the current conductor is about 0.025 mm to about 0.05 mm. In another embodiment, the current collector may be a foil type or mesh type having two or more layers.

The lithium-ion battery may be encapsulated to provide protection against damage or environmental factors. In a preferred embodiment, the lithium-ion battery is encapsulated in a laminate. In this connection, the lithium-ion battery may be encapsulated in plastic film. Plastic films for encapsulation include polyamide, mylar, polyester, and polyolefin. Upon encapsulation, provisions should be made so that electrical contact can be made from outside the cell to the current collectors of the battery.

The slurry anode and slurry cathode are prepared by mixing their respective components with the exception of the current collector. The components are thoroughly mixed in order to form a uniform slurry. The thus formed uniform slurries may be separately stored in a tightly covered (airtight) container before proceeding. Alternatively, the uniformly mixed components are immediately applied to a separator or a current collector and subjected to further processing.

Once the slurries are applied to the respective current collectors, a separator is provided between the slurry covered collectors. The elements are combined, with pressure, so as to form a lithium-ion battery. The order in which the respective components are assembled is of no particular importance. For example, in one embodiment, a slurry anode may be applied to a current collector. A separator is provided over the slurry anode covered current collector. Next, a cathode slurry is applied to a second current collector and the slurry cathode covered current collector is placed onto the separator. Alternatively, the cathode slurry is applied to the separator and the second current collector is provided over the slurry cathode. In another embodiment, a slurry cathode may be applied to a current collector. A separator is provided over the slurry cathode covered current collector. Next, an anode slurry is applied to a second current collector and the slurry anode covered current collector is placed onto the separator. Alternatively, the anode slurry is applied to the separator and the second current collector is provided over the slurry anode. Various modifications of the assembly procedure described above may be implemented in order to make a lithium-ion battery in accordance with the present invention.

In a preferred embodiment, lithium-ion batteries made in accordance with the present invention contain one slurry anode and one slurry cathode. In another embodiment, multilayer lithium-ion batteries made in accordance with the present invention contain two or more slurry anodes and two or more slurry cathodes, including a bipolar configuration.

The resultant lithium-ion battery may be partially or entirely encapsulated in various laminates to provide protection for the battery. For example, the lithium-ion battery may be encapsulated in a polyamide film. If the battery is encapsulated, then provisions should be made so that electrical contact can be made from outside of the battery to the current collectors of the battery. This may be accomplished by an aperture in the laminate thereby exposing a selected area of each of the current collectors.

FIG. 1 represents an illustration of an embodiment of a lithium-ion battery according to the present invention. The lithium-ion battery 1 contains a base insulator 10 and an insulator 2 sandwiching the other components of the battery. Just above the base insulator 10 is an anode current collector 9 and an anode slurry 5. Just below the insulator 2 is a cathode current collector 3 and a cathode slurry 7. Between the cathode slurry 7 and the anode slurry 5 is a separator 6. The lithium-ion battery 1 also contains window frames 4 for providing structural support to the battery.

The lithium-ion batteries made according to the present invention exhibit repeated cycles which are substantially uniform. Further, the lithium-ion batteries made according to the present invention exhibit a discharge capacity at an adequate level during the cycles which is substantially consistent.

While not intending to be so limiting, the following examples illustrate the novel batteries and methods of the present invention.

EXAMPLE 1

A slurry anode is prepared as follows. Synthetic graphite (10 g) is mixed with up to about 1 g of carbon black and 6–10 g of 1M $LiPF_6$ in an organic solvent mixture of ethylene carbonate and dimethyl carbonate. The components are mixed until a uniform slurry is obtained.

A slurry cathode is prepared as follows. $LiCoO_2$ (10 g) is mixed with 0.5–1 g of carbon black and 3–5 g of 1M $LiPF_6$ in an organic solvent mixture of ethylene carbonate and dimethyl carbonate.

The slurry anode is applied on a copper current collector while the slurry cathode is applied on an aluminum current collector, and a separator is provided between the slurry covered collectors. The elements are combined, with pressure, so as to form a lithium-ion battery.

EXAMPLE 2

A slurry anode is prepared as follows. Natural graphite (10 g) is mixed with up to about 1 g of carbon black and 6–10 g of 1M $LiPF_6$ in an organic solvent mixture of ethylene carbonate and diethyl carbonate. The components are mixed until a uniform slurry is obtained.

A slurry cathode is prepared as follows. $LiCoO_2$ (10 g) is mixed with 0.5–1 g of carbon black and 3–5 g of 1M $LiPF_6$ in an organic solvent mixture of ethylene carbonate and diethyl carbonate.

The slurry anode is applied on a copper current collector while the slurry cathode is applied on an aluminum current collector, and a separator is provided between the slurry covered collectors. The elements are combined, with pressure, so as to form a lithium-ion battery.

EXAMPLE 3

A slurry anode is prepared as follows. Synthetic graphite (10 g) is mixed with up to about 1 g of carbon black and 6–10 g of 1M $LiPF_6$ in an organic solvent mixture of ethylene carbonate and dimethyl carbonate. The components are mixed until a uniform slurry is obtained.

A slurry cathode is prepared as follows. $LiNiO_2$ (10 g) is mixed with 0.5–1 g of carbon black and 3–5 g of 1M $LiPF_6$ in an organic solvent mixture of ethylene carbonate and dimethyl carbonate.

The slurry anode is applied on a copper current collector while the slurry cathode is applied on an aluminum current collector, and a separator is provided between the slurry covered collectors. The elements are combined, with pressure, so as to form a lithium-ion battery.

EXAMPLE 4

A slurry anode is prepared as follows. Synthetic graphite (10 g) is mixed with up to about 1 g of carbon black and 6–10 g of 1M $LiPF_6$ in an organic solvent mixture of ethylene carbonate and diethyl carbonate. The components are mixed until a uniform slurry is obtained.

A slurry cathode is prepared as follows. $LiNiO_2$ (10 g) is mixed with 0.5–1 g of carbon black and 3–5 g of 1M $LiPF_6$ in an organic solvent mixture of ethylene carbonate and diethyl carbonate.

The slurry anode is applied on a copper current collector while the slurry cathode is applied on an aluminum current collector, and a separator is provided between the slurry covered collectors. The elements are combined, with pressure, so as to form a lithium-ion battery.

EXAMPLE 5

A slurry anode is prepared as follows. Natural graphite (10 g) is mixed with up to about 1 g of carbon black and 6–10 g of 1M $LiPF_6$ in an organic solvent mixture of ethylene carbonate and dimethyl carbonate. The components are mixed until a uniform slurry is obtained.

A slurry cathode is prepared as follows. $LiMn_2O_4$ (10 g) is mixed with 0.5–1 g of carbon black and 3–5 g of 1M $LiPF_6$ in an organic solvent mixture of ethylene carbonate and dimethyl carbonate.

The slurry anode is applied on a copper current collector while the slurry cathode is applied on an aluminum current collector, and a separator is provided between the slurry covered collectors. The elements are combined, with pressure, so as to form a lithium-ion battery.

EXAMPLE 6

A slurry anode is prepared as follows. Petroleum coke (10 g) is mixed with up to about 1 g of carbon black and 6–10 g of 1M $LiPF_6$ in an organic solvent mixture of ethylene carbonate and dimethyl carbonate. The components are mixed until a uniform slurry is obtained.

A slurry cathode is prepared as follows. $LiCoO_2$ (10 g) is mixed with 0.5–1 g of carbon black and 3–5 g of 1M $LiPF_6$ in an organic solvent mixture of ethylene carbonate and dimethyl carbonate.

The slurry anode is applied on a copper current collector while the slurry cathode is applied on an aluminum current collector, and a separator is provided between the slurry covered collectors. The elements are combined, with pressure, so as to form a lithium-ion battery.

EXAMPLE 7

A slurry anode is prepared as follows. Petroleum coke (10 g) is mixed with up to about 1 g of carbon black and 6–10 g of 1M $LiPF_6$ in an organic solvent mixture of ethylene carbonate and dimethyl carbonate. The components are mixed until a uniform slurry is obtained.

A slurry cathode is prepared as follows. $LiNiO_2$ (10 g) is mixed with 0.5–1 g of carbon black and 3–5 g of 1M $LiPF_6$ in an organic solvent mixture of ethylene carbonate and dimethyl carbonate.

The slurry anode is applied on a copper current collector while the slurry cathode is applied on an aluminum current collector, and a separator is provided between the slurry covered collectors. The elements are combined, with pressure, so as to form a lithium-ion battery.

EXAMPLE 8

A slurry anode is prepared as follows. Petroleum coke (10 g) is mixed with up to about 1 g of carbon black and 6–10 g of 1M $LiPF_6$ in an organic solvent mixture of ethylene carbonate and dimethyl carbonate. The components are mixed until a uniform slurry is obtained.

A slurry cathode is prepared as follows. $LiMn_2O_4$ (10 g) is mixed with 0.5–1 g of carbon black and 3–5 g of 1M $LiPF_6$ in an organic solvent mixture of ethylene carbonate and dimethyl carbonate.

The slurry anode is applied on a copper current collector while the slurry cathode is applied on an aluminum current collector, and a separator is provided between the slurry covered collectors. The elements are combined, with pressure, so as to form a lithium-ion battery.

EXAMPLE 9

A slurry anode is prepared as follows. Petroleum coke (10 g) is mixed with up to about 1 g of carbon black and 6–10 g of 1M $LiPF_6$ in an organic solvent mixture of ethylene carbonate and propylene carbonate. The components are mixed until a uniform slurry is obtained.

A slurry cathode is prepared as follows. $LiCoO_2$ (10 g) is mixed with 0.5–1 of carbon black and 3–5 g of 1M $LiPF_6$ in an organic solvent mixture of ethylene carbonate and propylene carbonate.

The slurry anode is applied on a copper current collector while the slurry cathode is applied on an aluminum current collector, and a separator is provided between the slurry covered collectors. The elements are combined, with pressure, so as to form a lithium-ion battery.

EXAMPLE 10

A slurry anode is prepared as follows. Petroleum coke (10 g) is mixed with up to about 1 g of carbon black and 6–10 g of 1M $LiPF_6$ in an organic solvent mixture of ethylene carbonate and propylene carbonate. The components are mixed until a uniform slurry is obtained.

A slurry cathode is prepared as follows. $LiNiO_2$ (10 g) is mixed with 0.5–1 g of carbon black and 3–5 g of 1M $LiPF_6$ in an organic solvent mixture of ethylene carbonate and propylene carbonate.

The slurry anode is applied on a copper current collector while the slurry cathode is applied on an aluminum current collector, and a separator is provided between the slurry covered collectors. The elements are combined, with pressure, so as to form a lithium-ion battery.

While the invention has been explained in relation to its preferred embodiments, it is to be understood that various modifications thereof will become apparent to those skilled in the art upon reading the specification. Therefore, it is to be understood that the invention disclosed herein is intended to cover such modifications.

What is claimed is:

1. A lithium-ion battery comprising:
   a slurry anode comprising about 55 to about 80% by weight of a carbonaceous material, about 1 to about 4% by weight of a first electrolyte salt and about 18 to about 40% by weight of a first organic solvent; and
   a slurry cathode comprising about 1 to about 5% by weight of a second electrolyte salt, about 20 to about 45% by weight of a second organic solvent, about 55 to about 80% by weight of a lithium transition metal oxide and about 1 to about 20% by weight of the lithium transition metal oxide of a conductor;
   with the proviso that neither the slurry anode nor the slurry cathode contain a binder.

2. The lithium-ion battery of claim 1, with the further proviso that neither the slurry anode nor the slurry cathode contain an aqueous solvent.

3. The lithium-ion battery of claim 1, wherein the first and second organic solvents are the same.

4. The lithium-ion battery of claim 1, wherein the carbonaceous material is selected from the group consisting of synthetic and natural graphite, petroleum coke, carbon fiber and modified graphite.

5. The lithium-ion battery of claim 1, wherein the first and second organic solvents of the slurry anode and the slurry cathode are individually at least one selected from ethylene carbonate, dimethyl carbonate, diethyl carbonate, dipropyl carbonate, and propylene carbonate.

6. The lithium-ion battery of claim 1, wherein the first and second electrolyte salts are lithium-containing salts.

7. The lithium-ion battery of claim 1, wherein the first and second electrolyte salts are individually selected from the group consisting of $LiPF_6$, $LiAsF_6$, and $LiClO_4$.

8. The lithium-ion battery of claim 1, wherein the lithium transition metal oxide is selected from the group consisting of $LiMn_2O_4$, $LiCoO_2$, $LiNiO_2$ and $LiCo_{1-x}Ni_xO_2$ (where x<1).

9. A method of preparing a lithium-ion battery comprising:

preparing a slurry anode by combining about 55 to about 80% by weight of a carbonaceous material, about 1 to about 4% by weight of a first electrolyte salt, and about 18 to about 40% by weight of a first organic solvent, with the proviso that the slurry anode does not contain a binder;

providing a slurry cathode by combining about 55 to about 80% by weight of a lithium transition metal oxide, about 1 to about 5% by weight of a second electrolyte salt about 20 to about 45% by weight of a second organic solvent and about 1 to about 20% by weight of the lithium transition metal oxide of a conductor, with the proviso that the slurry cathode does not contain a binder;

casting the slurry anode on a first metal collector;

casting the slurry cathode on a second metal collector; and combining the slurry anode and the slurry cathode with a separator therebetween so as to form a lithium-ion battery.

10. The method of claim 9, wherein the first and second organic solvents are the same.

11. The method of claim 9, wherein the carbonaceous material is selected from the group consisting of synthetic and natural graphite, and petroleum coke.

12. The method of claim 9, wherein the first and second organic solvents of the slurry anode and the slurry cathode are individually at least one selected from ethylene carbonate, dimethyl carbonate, diethyl carbonate, dipropyl carbonate, and propylene carbonate.

13. The method of claim 9, wherein the first and second electrolyte salts are lithium-containing salts.

14. The method of claim 9, wherein the electrolyte salt is selected from the group consisting of $LIPF_6$, $LiAsF_6$, and $LiCO_4$.

15. The method of claim 9, wherein the lithium transition metal oxide is selected from the group consisting of $LiMn_2O_4$, $LiCoO_2$, and $LiNiO_2$.

16. The method of claim 9, with the further proviso that neither the slurry anode nor the slurry cathode contain an aqueous solvent.

17. A lithium-ion battery comprising:

a slurry anode comprising about 55 to about 80% by weight of a carbonaceous material, about 1 to about 4% by weight of a first electrolyte salt and about 18 to about 40% by weight of a first organic solvent; and a slurry cathode comprising about 1 to about 5% by weight of a second electrolyte salt, about 20 to about 45% by weight of a second organic solvent, about 55 to about 80% by weight of a lithium transition metal oxide and about 1 to about 20% by weight of the lithium transition metal oxide of a conductor;

with the proviso that neither the slurry anode nor the slurry cathode contain a binder or an elastomer.

18. The lithium-ion battery of claim 17, wherein the carbonaceous material is selected from the group consisting of synthetic and natural graphite, petroleum coke, carbon fiber and modified graphite.

19. The lithium-ion battery of claim 17, wherein the first and second organic solvents of the slurry anode and the slurry cathode are individually at least one selected from ethylene carbonate, dimethyl carbonate, diethyl carbonate, dipropyl carbonate, and propylene carbonate.

* * * * *